United States Patent
Qi

(10) Patent No.: US 12,075,240 B2
(45) Date of Patent: Aug. 27, 2024

(54) AUTHENTICATION METHOD AND APPARATUS

(71) Applicant: Siemens Aktiengesellschaft, Munich (DE)

(72) Inventor: Lin Qi, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 317 days.

(21) Appl. No.: 17/609,134

(22) PCT Filed: May 6, 2019

(86) PCT No.: PCT/CN2019/085697
§ 371 (c)(1),
(2) Date: Nov. 5, 2021

(87) PCT Pub. No.: WO2020/223873
PCT Pub. Date: Nov. 12, 2020

(65) Prior Publication Data
US 2022/0217532 A1 Jul. 7, 2022

(51) Int. Cl.
*H04W 12/06* (2021.01)
*H04W 4/021* (2018.01)
*H04W 12/63* (2021.01)

(52) U.S. Cl.
CPC .......... *H04W 12/06* (2013.01); *H04W 4/021* (2013.01); *H04W 12/63* (2021.01)

(58) Field of Classification Search
CPC ... H04W 12/06; H04W 12/08; H04W 12/104; H04W 12/63; H04W 4/021
See application file for complete search history.

(56) References Cited

U.S. PATENT DOCUMENTS

| 7,930,387 B2* | 4/2011 | Hasegawa | H04W 4/029 709/224 |
| 8,903,878 B2* | 12/2014 | Kihara | G06F 3/0611 707/758 |

(Continued)

FOREIGN PATENT DOCUMENTS

| CN | 1951141 A | 4/2007 |
| CN | 104704789 A | 6/2015 |

(Continued)

OTHER PUBLICATIONS

International Search Report and Written Opinion dated Jan. 23, 2020.

(Continued)

*Primary Examiner* — Hosuk Song
(74) *Attorney, Agent, or Firm* — Harness, Dickey & Pierce, P.L.C.

(57) ABSTRACT

An authentication method and apparatus are provided. In an embodiment, the authentication method includes: receiving, by a first network node, an enrollment request from a second network node; obtaining, by the first network node, position information of the second network node; and authenticating, by the first network node, the second network node according to the obtained position information of the second network node. A flexible simple authentication solution is provided, having low deployment costs.

15 Claims, 2 Drawing Sheets

(56) References Cited

U.S. PATENT DOCUMENTS

| | | | | |
|---|---|---|---|---|
| 8,953,565 | B1* | 2/2015 | Schlesener | H04W 48/16 |
| | | | | 455/11.1 |
| 9,769,802 | B2* | 9/2017 | Cho | H04W 48/14 |
| 9,894,600 | B1* | 2/2018 | Habib | H04L 12/6418 |
| 9,924,486 | B2* | 3/2018 | Lee | H04W 64/00 |
| 9,948,492 | B2* | 4/2018 | Jung | H04L 69/329 |
| 9,974,007 | B2* | 5/2018 | Yan | H04W 48/14 |
| 10,511,475 | B2* | 12/2019 | Borowicz | G06F 16/27 |
| 2007/0197205 | A1 | 8/2007 | Ishikawa | |
| 2014/0031011 | A1 | 1/2014 | West | |
| 2015/0065165 | A1 | 3/2015 | Zhang | |
| 2015/0264040 | A1 | 9/2015 | Schneider | |
| 2015/0312952 | A1* | 10/2015 | Fodor | H04W 72/1215 |
| | | | | 370/329 |
| 2018/0199153 | A1 | 7/2018 | Du et al. | |
| 2018/0288046 | A1 | 10/2018 | Celi, Jr. et al. | |

FOREIGN PATENT DOCUMENTS

| | | |
|---|---|---|
| CN | 105323308 A | 2/2016 |
| WO | WO 2018035024 A1 | 2/2018 |

OTHER PUBLICATIONS

Wen-Ching, Chen et al.; "An RSSI-based Distributed Real-time Indoor Positioning Framework"; Department of Information Networking Technology, Hsiuping University of Science and Technology 11; Proceedings of IEEE International Conference on Applied Sxstem Innovation 2018; 2018.

Shamir, Adi et al.; "Identity-based cryptosystems and signature schemes"; electronic publishing; artistic imaging, and digital typography; Springer Verlag, DE; Jan. 1985; XP000675444; DOI: 10.1007/3-540-39568-7_5;; 1985.

Miika Komu et al.; "Applying a Cryptographic Namespace to Applications"; Sep. 2, 2005; pp. 23-27; XP058264001; DOI: 10.1145/1080776.1080786.

Pritkin M et al.; "Enrollment over Secure Transport"; Internet Engineering Task Force; Geneva, Switzerland; Oct. 23, 2013; pp. 1-53; XP015094936; 2013.

* cited by examiner

AUTHENTICATION METHOD AND APPARATUS

PRIORITY STATEMENT

This application is the national phase under 35 U.S.C. § 371 of PCT International Application No. PCT/CN2019/085697 filed May 6, 2019, which designated the United States of America 2020, the entire contents of which are hereby incorporated herein by reference.

BACKGROUND

Field

Embodiments of the present invention generally relate to the communications field, and in particular, to an authentication method and apparatus.

Background

When a client requests a service from a server, the server can provide the service to the client only after the server has confirmed validity of the client identity. Currently, if the client cannot provide a digital certificate to the server, authentication on initial enrollment cannot be completed. In an existing solution, initial installation of the digital certificate may be performed manually for clients, but it consumes a lot of time. Especially when client devices are from different providers, the installation means are different, causing the installation more time-consuming. In another existing solution, a proxy may be added between a client and a server, and the proxy is responsible for providing a digital certificate to the client. However, this method results in relatively low communication security.

In a conventional IT system, complex encryption means are usually used to improve the security. However, in an industrial system, increasing security means may seriously affect a response capability of the system. For example, if each industry control device frequently accesses a background server to authenticate transmission information, the operation efficiency of the entire system will be affected. In addition, such an information security system needs to simultaneously operate many servers for support, and the deployment costs are also very high.

In addition, some devices having constrained resources and a constrained processing capability only have little storage space and a limited computation capability, and therefore, usually cannot support a complex transport protocol, have a relative low data transmission rate, cannot perform complex security processing, and are easily under security threats. Therefore, such constrained devices also lack an effective security authentication method.

SUMMARY

In view of the foregoing problem, the present invention is disclosed to provide an authentication method and apparatus for overcoming or partially resolving the foregoing problem.

According to a first embodiment of the present invention, an authentication method is provided, including: receiving, by a first network node, an enrollment request from a second network node; obtaining, by the first network node, position information of the second network node; and authenticating, by the first network node, the second network node according to the obtained position information of the second network node. The authentication method is simple and flexible, and is suitable for data communication features in the industry control field.

According to another embodiment of the present invention, an authentication apparatus is provided, including: a receiving module, configured to receive an enrollment request from the second network node and position information of the second network node; and an authentication module, configured to authenticate the second network node according to the position information of the second network node. The authentication apparatus is suitable for data communication features in the industry control field, has low deployment costs, and is easy to implement.

According to still another embodiment of the present invention, an authentication apparatus is provided, including: at least one memory, configured to store machine readable instructions; and at least one processor, configured to execute the machine readable instructions, to perform the method according to any optional implementation of the first embodiment. The authentication apparatus is suitable for data communication features in the industry control field, has low deployment costs, and is easy to implement.

According to yet another embodiment of the present invention, a computer readable medium is provided. The machine-readable medium stores machine readable instructions, and when the machine readable instructions are executed by the processor, the processor is caused to perform the method according to any optional implementation of the first embodiment.

According to a second embodiment of the present invention, an authentication method is provide, including: determining, by a fourth network node, position information of a second network node; and sending, by the fourth network node, the position information of the second network node to a first network node, where the position information is used by the first network node to authenticate the second network node. The authentication method is simple and flexible, and is suitable for data communication features in the industry control field.

According to another embodiment of this application, an authentication apparatus is provided, including: a positioning module, configured to determine position information of a second network node; and a sending module, configured to send the position information of the second network node to a first network node, where the position information is used by the first network node to authenticate the second network node. The authentication apparatus is suitable for data communication features in the industry control field, has low deployment costs, and is easy to implement.

According to still another embodiment of the present invention, an authentication apparatus is provided, including: at least one memory, configured to store machine readable instructions; and at least one processor, configured to execute the machine readable instructions, to perform the method according to any optional implementation of the second embodiment. The authentication apparatus is suitable for data communication features in the industry control field, has low deployment costs, and is easy to implement.

According to yet another embodiment of the present invention, a computer readable medium is provided. The machine-readable medium stores machine readable instructions, and when the machine readable instructions are executed by the processor, the processor is caused to perform the method according to any optional implementation of the second embodiment.

According to a third embodiment of the present invention, an authentication method is provided, including: sending, by a second network node, an enrollment request to a first network node; and receiving, by the second network node, an enrollment response sent by the first network node after the first network node performs authentication according to position information of the second network node. The authentication method is simple and flexible, and is suitable for data communication features in the industry control field.

According to another embodiment of this application, an authentication apparatus is provided, including: a sending module, configured to send an enrollment request to a first network node; and a receiving module, configured to receive an enrollment response sent by the first network node after the first network node performs authentication according to position information of a second network node. The authentication apparatus is suitable for data communication features in the industry control field, has low deployment costs, and is easy to implement.

According to still another embodiment of the present invention, an authentication apparatus is provided, including: at least one memory, configured to store machine readable instructions; and at least one processor, configured to execute the machine readable instructions, to perform the method according to any optional implementation of the third embodiment. The authentication apparatus is suitable for data communication features in the industry control field, has low deployment costs, and is easy to implement.

According to yet another embodiment of the present invention, a computer readable medium is provided. The machine-readable medium stores machine readable instructions, and when the machine readable instructions are executed by the processor, the processor is caused to perform the method according to any optional implementation of the third embodiment.

BRIEF DESCRIPTION OF THE DRAWINGS

The accompanying drawings are included to provide a further understanding of the present invention, are incorporated in and constitute a part of this application. The accompanying drawings illustrate embodiments of the present invention and explain the principle of the present invention together with the description. In the accompanying drawings.

DETAILED DESCRIPTION OF THE EXAMPLE EMBODIMENTS

Figure 1:
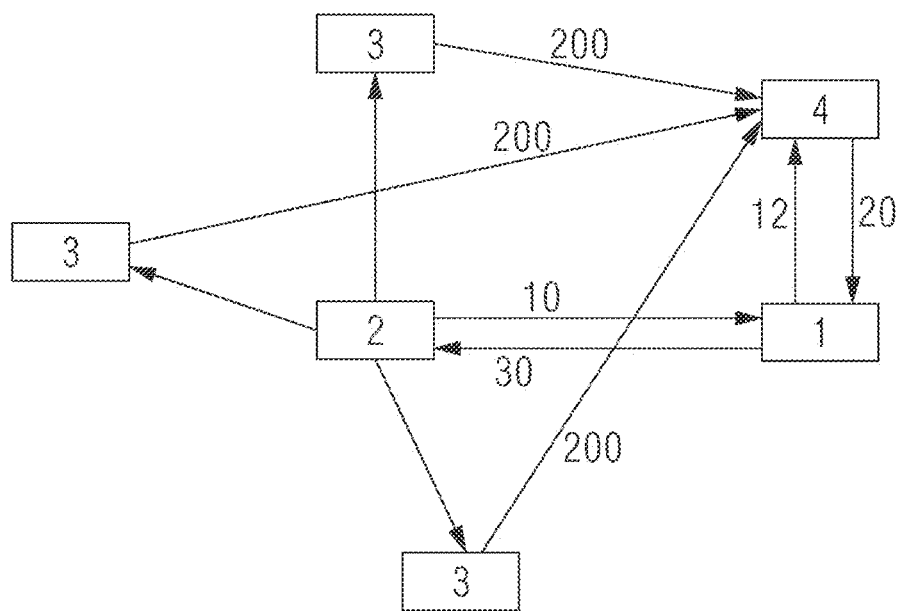
FIG. 1 is a schematic structural diagram of a network according to a preferred embodiment of the present invention.

According to a first embodiment of the present invention, an authentication method is provided, including: receiving, by a first network node, an enrollment request from a second network node; obtaining, by the first network node, position information of the second network node; and authenticating, by the first network node, the second network node according to the obtained position information of the second network node. The authentication method is simple and flexible, and is suitable for data communication features in the industry control field.

Optionally, after the receiving, by a first network node, an enrollment request from a second network node, the authentication method further includes: obtaining a public key of the second network node from the enrollment request; and the step of obtaining, by the first network node, position information of the second network node further includes: sending, by the first network node, public key information of the second network node to a fourth network node, and receiving the position information of the second network node sent by the fourth network node after the fourth network node determines the second network node corresponding to the public key information, where the public key information of the second network node is the public key of the second network node or is an operation value that uniquely corresponds to the second network node and that is calculated according to the public key of the second network node. In this way, the security of information transmission between network nodes is improved, and a secure communication process and an encryption authentication process become extremely simple and are suitable for low power consumption transmission.

Optionally, in the authentication method, the step of authenticating, by the first network node, the second network node according to the obtained position information of the second network node further includes: determining, by the first network node, whether the position information is within a preset trustable region; and if the position information is within the preset trustable region, responding, by the first network node, to the enrollment request; or if the position information is not within the preset trustable region, forbidding, by the first network node, the enrollment request.

Optionally, in the authentication method, the first network node is an Enrollment over Secure Transport (EST) server, the second network node is an EST client, and the fourth network node is a positioning server.

According to another embodiment of the present invention, an authentication apparatus is provided, including: a receiving module, configured to receive an enrollment request from the second network node and position information of the second network node; and an authentication module, configured to authenticate the second network node according to the position information of the second network node. The authentication apparatus is suitable for data communication features in the industry control field, has low deployment costs, and is easy to implement.

Optionally, in the authentication apparatus, the receiving module is further configured to: after receiving the enrollment request from the second network node, obtain a public key of the second network node from the enrollment request; and when receiving the position information of the second network node, the receiving module is specifically configured to: send public key information of the second network node to a fourth network node, and receive the position information of the second network node sent by the fourth network node after the fourth network node determines the second network node corresponding to the public key information, where the public key information of the second network node is the public key of the second network node or is an operation value that uniquely corresponds to the second network node and that is calculated according to the public key of the second network node.

Optionally, in the authentication apparatus, when authenticating the second network node, the authentication module is specifically configured to: determine whether the position information is within a preset trustable region; and if the position information is within the preset trustable region, respond to the enrollment request; or if the position information is not within the preset trustable region, forbid the enrollment request.

Optionally, in the authentication apparatus, the second network node is an EST client, and the fourth network node is a positioning server.

According to still another embodiment of the present invention, an authentication apparatus is provided, including: at least one memory, configured to store machine readable instructions; and at least one processor, configured to execute the machine readable instructions, to perform the method according to any optional implementation of the first embodiment. The authentication apparatus is suitable for data communication features in the industry control field, has low deployment costs, and is easy to implement.

According to yet another embodiment of the present invention, a computer readable medium is provided. The machine-readable medium stores machine readable instructions, and when the machine readable instructions are executed by the processor, the processor is caused to perform the method according to any optional implementation of the first embodiment.

According to a second embodiment of the present invention, an authentication method is provide, including: determining, by a fourth network node, position information of a second network node; and sending, by the fourth network node, the position information of the second network node to a first network node, where the position information is used by the first network node to authenticate the second network node. The authentication method is simple and flexible, and is suitable for data communication features in the industry control field.

Optionally, before the determining, by a fourth network node, position information of a second network node, the authentication method further includes: receiving, by the fourth network node public key information from the first network node, and determining the second network node corresponding to the public key information, where the public key information of the second network node is a public key of the second network node or is an operation value that uniquely corresponds to the second network node and that is calculated according to a public key of the second network node. In this way, the security of information transmission between network nodes is improved, and a secure communication process and an encryption authentication process become extremely simple and are suitable for low power consumption transmission.

Optionally, in the authentication method, the step of determining, by a fourth network node, position information of a second network node further includes: receiving wireless information sent by at least one third network node, where the wireless information sent by each third network node includes transmitted-signal strength information of the second network node, received-signal strength information of a signal transmitted by the second network node and received by the third network node, and space position information of the third network node; and determining the position information of the second network node according to the wireless information sent by the at least one third network node.

Optionally, the authentication method, the fourth network node determines the position information of the second network node according to respective wireless information from third network nodes deployed in at least three different positions.

Optionally, in the authentication method, the first network node is an Enrollment over Secure Transport (EST) server, the second network node is an EST client, the third network node is a Bluetooth low energy receiver, and the fourth network node is a positioning server. Using the Bluetooth low energy receiver can ensure information transmission with low power consumption, and further reduce the costs.

Optionally, in the authentication method, the fourth network node is integrated with the first network node, thereby further reducing space and the costs.

According to another embodiment of this application, an authentication apparatus is provided, including: a positioning module, configured to determine position information of a second network node; and a sending module, configured to send the position information of the second network node to a first network node, where the position information is used by the first network node to authenticate the second network node. The authentication apparatus is suitable for data communication features in the industry control field, has low deployment costs, and is easy to implement.

Optionally, in the authentication apparatus, before determining the position information of the second network node, the positioning module is further configured to receive public key information from the first network node, and determine the second network node corresponding to the public key information, where the public key information of the second network node is a public key of the second network node or is an operation value that uniquely corresponds to the second network node and that is calculated according to a public key of the second network node.

Optionally, in the authentication apparatus, when determining the position information of the second network node, the positioning module is specifically configured to: receive wireless information sent by at least one third network node, where the wireless information sent by each third network node includes transmitted-signal strength information of the second network node, received-signal strength information of a signal transmitted by the second network node and received by the third network node, and space position information of the third network node; and determine the position information of the second network node according to the wireless information sent by the at least one third network node.

Optionally, in the authentication apparatus, the positioning module is further configured to determine the position information of the second network node according to respective wireless information from third network nodes deployed in at least three different positions.

Optionally, in the authentication apparatus, the first network node is an Enrollment over Secure Transport (EST) server, the second network node is an EST client, the third network node is a Bluetooth low energy receiver, and the fourth network node is a positioning server.

Optionally, in the authentication apparatus, the fourth network node is integrated with the first network node.

According to still another embodiment of the present invention, an authentication apparatus is provided, including: at least one memory, configured to store machine readable instructions; and at least one processor, configured to execute the machine readable instructions, to perform the method according to any optional implementation of the second embodiment. The authentication apparatus is suitable for data communication features in the industry control field, has low deployment costs, and is easy to implement.

According to yet another embodiment of the present invention, a computer readable medium is provided. The machine-readable medium stores machine readable instructions, and when the machine readable instructions are executed by the processor, the processor is caused to perform the method according to any optional implementation of the second embodiment.

According to a third embodiment of the present invention, an authentication method is provided, including: sending, by a second network node, an enrollment request to a first network node; and receiving, by the second network node, an enrollment response sent by the first network node after the first network node performs authentication according to position information of the second network node. The authentication method is simple and flexible, and is suitable for data communication features in the industry control field.

Optionally, the authentication method further includes: sending, by the second network node, public key information of the second network node to a fourth network node, where the public key information of the second network node is a public key of the second network node or is an operation value that uniquely corresponds to the second network node and that is calculated according to a public key of the second network node, and the fourth network node is configured to provide the position information of the second network node for the first network node; the step of sending, by a second network node, an enrollment request to a first network node further includes: adding, by the second network node, the public key of the second network node to the enrollment request; and the receiving, by the second network node, an enrollment response sent by the first network node after the first network node performs authentication according to position information of the second network node includes: receiving, by the second network node, the position information of the second network node obtained after the first network node provides the public key information of the second network node for the fourth network node, and receiving the enrollment response sent after the authentication is performed according to the position information of the second network node.

According to another embodiment of this application, an authentication apparatus is provided, including: a sending module, configured to send an enrollment request to a first network node; and a receiving module, configured to receive an enrollment response sent by the first network node after the first network node performs authentication according to position information of a second network node. The authentication apparatus is suitable for data communication features in the industry control field, has low deployment costs, and is easy to implement.

Optionally, in the authentication apparatus, the sending module is further configured to: send public key information of the second network node to a fourth network node, where the public key information of the second network node is a public key of the second network node or is an operation value that uniquely corresponds to the second network node and that is calculated according to a public key of the second network node, and the fourth network node is configured to provide the position information of the second network node for the first network node; when sending the enrollment request to the first network node, the sending module is specifically configured to add the public key of the second network node to the enrollment request; and when receiving the enrollment response sent by the first network node after the first network node performs authentication according to the position information of the second network node, the receiving module is specifically configured to: receive the position information of the second network node obtained after the first network node provides the public key information of the second network node for the fourth network node, and receive the enrollment response sent after the authentication is performed according to the position information of the second network node.

According to still another embodiment of the present invention, an authentication apparatus is provided, including: at least one memory, configured to store machine readable instructions; and at least one processor, configured to execute the machine readable instructions, to perform the method according to any optional implementation of the third embodiment. The authentication apparatus is suitable for data communication features in the industry control field, has low deployment costs, and is easy to implement.

According to yet another embodiment of the present invention, a computer readable medium is provided. The machine-readable medium stores machine readable instructions, and when the machine readable instructions are executed by the processor, the processor is caused to perform the method according to any optional implementation of the third embodiment.

It should be understood that the foregoing general descriptions and the following detailed descriptions of the present invention are exemplary and illustrative, and are intended for providing further explanations for the present invention subjected to the claims.

Embodiments of the present invention are described in detail in the following with reference to the accompanying drawings. Now detailed reference is made to the preferred embodiments of the present invention, and examples thereof are shown in the accompanying drawings. In any possible case, same marks are used to represent same or similar parts in all the accompanying drawings. In addition, although terms used in the present invention are selected from common and known terms, some terms mentioned in the specification of the present invention may be selected by the applicant according his or her judgment, and detailed meanings thereof are described in related parts of the specification. Furthermore, the present invention needs to be understood not simply by the actual terms used but by the meanings of each term lying within.

The present invention provides a flexible simple authentication solution with low deployment costs. This solution is applicable for communication in an industrial system.

A network node means that a computer or another device is connected to a network having an independent address and a data sending or receiving function. The network node may be a workstation, a customer, a network user, or a personal computer, or may be a server, a printer, or a device connected to another network.

In an Enrollment over Secure Transport (EST) solution based on the Constrained Network Protocol, the Constrained Network Protocol may be, for example, the Constrained Application Protocol (CoAP), which is mainly applied to a constrained network in an Internet of Things environment. The constrained network is a Constrained Protocol-based network including a plurality of constrained devices. The constrained devices have relatively simple functions, only have little storage space and a limited computation capability, and therefore, usually cannot support a complex transport protocol, have a relative low data transmission rate, cannot perform complex security processing, and are easily under security threats.

Basic principles and preferred embodiments of the present invention are described in detail with reference to FIG. 1 and FIG. 2. As shown in FIG. 2, a network in an embodiment of the present invention may include: one first network node 1, at least one second network node 2, at least one third network node 3, and one fourth network node 4. The second network node 2 does not need to provide a digital certificate when accessing the first network node 1 for the first time. The first network node 1 can process, on the basis of position information 20 of the second network node 2, an enrollment request 10 sent by the second network node 2. Specifically, in a preferred embodiment, the first network node 1 may be, for example, an EST server, the second network node 2 may be, for example, an EST client, the third network node 3 may be, for example, a Bluetooth low energy receiver, and the fourth network node 4 may be, for example, a positioning server. Using the Bluetooth low energy receiver can ensure information transmission with low power consumption, the deployment costs are low, and it is easy to implement. In addition, in another embodiment, the third network node 3 is a Wi-Fi receiver.

Figure 2:
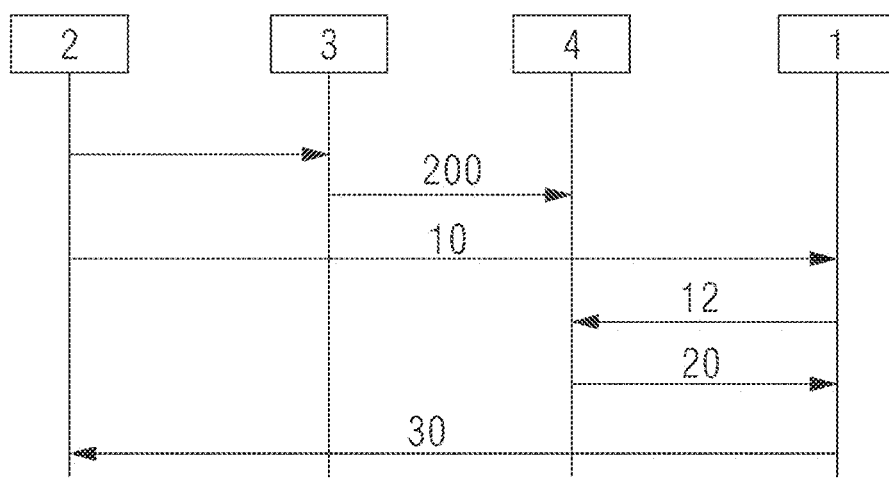
FIG. 2 is a schematic structural diagram of an authentication method according to a preferred embodiment of the present invention.

As shown in FIG. 1, the first network node 1 may receive the enrollment request 10 from the second network node 2, the first network node 1 may obtain the position information 20 of the second network node 2 from the fourth network node 4, and the first network node 1 may authenticate the second network node 2 according to the position information 20 of the second network node 2. When establishing a bottom-layer Datagram Transport Layer Security (DTLS) connection to the second network node 2, the first network node 1 does not need to provide a certificate, and the first network node 1 only needs to determine the position information of the second network node 2 to perform an authentication operation.

To ensure secure transmission of information, the transmitted information may be encrypted. Preferably, the enrollment request 10 sent by the second network node 2 further includes a public key of the second network node 2. After receiving the enrollment request 10 from the second network node 2, the first network node 1 parses the enrollment request 10 to extract the public key of the second network node 2, and the first network node 1 sends public key information 12 of the second network node 2 to the fourth network node 4. The fourth network node 4 may determine the second network node 2 corresponding to the public key information 12 and the position information 20 of the second network node 2, and the fourth network node 4 may send the position information 20 of the second network node 2 to the first network node. Subsequently, the first network node 1 may determine whether the position information 20 of the second network node 2 is within a preset trustable region; and if the position information 20 of the second network node 2 is within the preset trustable region, the first network node 1 respond to the enrollment request 10 of the second network node 2; or if the position information 20 of the second network node 2 is not within the preset trustable region, the first network node 1 forbids the enrollment request 10 of the second network node 2. Specifically, after performing authentication according to the position information 20 of the second network node 2, the first network node 1 sends an enrollment response 30 to the second network node 2.

In a specific embodiment, the public key information 12 of the second network node 2 may be the public key of the second network node 2 or may be an operation value that uniquely corresponds to the second network node 2 and that is calculated according to the public key the second network node 2. For example, a public key hash value may be obtained by calculating the public key of the second network node 2 by using a hash algorithm. The public key hash value is a character string having a fixed length. The character string compresses information or data, so that a data amount decreases. A data format is fixed, and is more applicable to low power consumption transmission. In an authentication process and an encryption communication process, the deployment costs are greatly reduced, and a secure communication process and an encryption authentication process become extremely simple and flexible, and are suitable for data communication features in the industry control field.

Further, the fourth network node 4 may determine the position information 20 of the second network node 2 by using wireless information 200 from the third network node 3. First, the second network node 2 sends a signal including signal strength information 140 to a plurality of third network nodes 3, the transmitted-signal strength information 140 may be, for example, signal transmission power; and the third network node 3 obtains strength information 160 of a transmit signal from the second network node 2 while receiving the signal. Subsequently, each third network node 3 sends the wireless information 200 to the fourth network node 4, where the wireless information 200 includes the strength information 160 of the received signal, the signal strength information 140 of the signal sent by the second network node 2, and space position information of the third network node 3; and the fourth network node 4 may determine the position information 20 of the second network node 2 according to the wireless information 200 respectively sent by three different third network nodes 3, where the position information 20 may be expressed as, for example, a coordinate address in a preset coordinate system. That is, in this embodiment, the third network node 3 can receive the transmit signal broadcast by the second network node 2 within a broadcast range; after receiving the transmit signal, the third network node 3 may forward the transmitted-signal strength information 140, the received-signal strength information 160, and the space position information of the third network node 3 that are included in the transmit signal to the fourth network node 4; the fourth network node 4 calculates the position information 20 of the second network node 2 according to the transmitted-signal strength information 140, the received-signal strength information 160, and the space position information of the third network node 3. Alternatively, in another embodiment, the fourth network node 4 stores the space position information of each third network node 3, where the wireless information 200 sent by the third network node 3 to the fourth network node 4 includes the transmitted-signal strength information 140 and the received-signal strength information 160; and the fourth network node 4 may calculate the position information 20 of the second network node 2.

Optionally, as shown in FIG. 1, the transmit signal broadcast by the second network node 2 and the wireless information 200 of the third network node 3 both include the public key information 12 of the second network node 2. If a data amount of public key data 120 is relatively large, for ease of transmission, the public key data 120 may be split into a plurality of subsequences. Each subsequence is transmitted by using the same transmitted-signal strength information 140, and each subsequence has a respective sequence number and respective subsequence total amount information, so that the third network node 3 re-establishes the public key data 120 after receiving a subsequence. The fourth network node 4 compares the public key information 12 in the enrollment request 10 of the second network node 2 with the public key information 12 in all the wireless information 200 from the third network nodes 3 piece by piece. If the public key information 12 extracted from the enrollment request 10 matches a public key from a second network node 2, the fourth network node 4 sends position information 20 of the matched second network node 2 to the first network node 1.

Preferably, the third network node 3 may be, for example, a Bluetooth low energy receiver, the transmit signal is transmitted in a data format of an ADV broadcast data packet, to reduce Bluetooth transmission load. In addition, in another preferred embodiment, the fourth network node 4 may be integrated with the first network node 1, thereby reducing space and the costs. The third network node 3 may be deployed in a working region (that is, a broadcast range) in an industrial system. In addition, to accurately obtain the position information 20 of the second network node 2, it needs to ensure that at least three third network nodes 3 deployed in different positions can receive the transmit signal sent by the second network node 2; and if the fourth network node 4 has received wireless information 200 sent by more than three third network node 3, as redundant information, the excess wireless information 200 is not processed.

In a specific embodiment, an EST client first broadcasts a transmit signal including a public key (or a public key hash value) and a signal transmission strength value (that is, transmitted-signal strength information) in forms of data packets. A plurality of Bluetooth low energy receivers is provided around the EST client. The Bluetooth low energy receiver also obtains a transmission strength value (that is, transmitted-signal strength information) and a receiving strength value (that is, received-signal strength information) of a broadcast transmit signal while receiving the signal. Subsequently, the Bluetooth low energy receiver sends the public key value, the transmit signal strength value, and the received-signal strength value from the EST client to a positioning server. The positioning server stores space position information, information about a trustable region range in an industrial system of all Bluetooth low energy receivers, to allow the positioning server to calculate, according to a signal transmission power value and a signal strength value, a position of the EST client sending the signal. After a bottom-layer security connection between the EST server and the EST client has been established, the EST client initiates an enrollment request to the EST server. The bottom-layer security connection may be, for example, a Datagram Transport Layer Security (DTLS) connection. The authentication method can support "Proof-of-Possession linking" in the EST protocol, thereby ensuring a securer enrollment process. After receiving the enrollment request sent by the EST client, the EST server receives parses the enrollment request to extract a public key, and then the EST server immediately sends the public key or a public key hash value to the positioning server. If the public key or the public key hash value matches a public key hash value sent by the Bluetooth low energy receiver, the positioning server allows the EST server to obtain a coordinate address (that is, position information) of an EST client matching the public key. If the coordinate address of the EST client is within the trustable region, authentication succeeds, and the EST server may generate a certificate according to the public key, sign on data of the certificate by using a private key of the EST server, and send the signed certificate to the EST client. The EST client may implement enrollment after obtaining the signature of the EST server; and correspondingly, if the coordinate address of the EST client is not within the trustable region, authentication performed by the EST server on the enrollment request of the EST client fails, forbid the enrollment request of the EST client. Optionally, the EST server may return corresponding error status information. In this embodiment, the EST client sends the enrollment request by using the Application Layer Protocol (for example, the CoAP). Moreover, a process in which the EST server extracts public key information from the enrollment request and queries the position information for authentication is also implemented by using the Application Layer Protocol (for example, CoAP). The enrollment request sent by the EST client to the EST server includes the public key. The public key (or the public key hash value) the EST client added by to a transmit signal broadcast to a receiver around the EST client is the same as the public key in the enrollment request.

In addition, in another embodiment, authentication may be performed by using a transmission layer. In this embodiment, the EST client obtains, from the DTLS security connection, an original public key sent by the EST client, and queries the position information for authentication. Correspondingly, the transmit signal broadcast by the EST client includes the original public key and the transmitted-signal strength information, where the original public key is used to authenticate the EST client when a bottom-layer security connection (a transmission layer) is established. The bottom-layer security connection may be, for example, a Datagram Transport Layer Security (DTLS) connection. When establishing a DTLS security connection to the EST server, the EST client does not need to provide a certificate, and the EST server only needs to perform an authentication operation by determining the position information of the EST client. Preferably, if the original public key in the transmit signal broadcast by the EST client has an excessively large data amount, to make the original public key more applicable to low power consumption transmission, the original public key may be split into a plurality of subsequences. The EST client sends each subsequence by using the same transmitted-signal strength information, and each subsequence has a respective sequence number and subsequence total amount information of the original public key. In this way, the receiver may re-establish the original public key after receiving the subsequence.

An embodiment of the present invention further provides an authentication apparatus. The apparatus may be a first network node 1, or the apparatus is located in a first network node 1. The apparatus includes: a receiving module, configured to receive an enrollment request 10 from a second network node 2 and position information 20 of the second network node 2.

Optionally, the receiving module is further configured to: after receiving the enrollment request 10 from the second network node 2, obtain a public key of the second network node 2 from the enrollment request 10; and when obtaining the position information 20 of the second network node 2, the receiving module is specifically configured to: send public key information 12 of the second network node 2 to a fourth network node 4, and receive the position information 20 of the second network node 2 sent by the fourth network node 4 after the fourth network node 4 determines the second network node 2 corresponding to the public key information 12, where the public key information 12 of the second network node 2 is the public key of the second network node 2 or is an operation value that uniquely corresponds to the second network node 2 and that is calculated according to the public key of the second network node 2.

Optionally, when authenticating the second network node 2, the authentication module is specifically configured to: determine whether the position information 20 is within a preset trustable region; and if the position information 20 is within the preset trustable region, respond, by the first network node 1, to the enrollment request 10; or if the position information 20 is not within the preset trustable region, forbid, by the first network node 1, the enrollment request 10.

Optionally, the first network node 1 is an EST server, the second network node 2 is an EST client, and the fourth network node 4 is a positioning server.

For other optional implementations of the apparatus, refer to the descriptions in the authentication method.

Further, an embodiment of the present invention further provides a security processing apparatus, including: at least one memory, configured to store machine readable instructions; and at least one processor, configured to execute the machine readable instructions, to perform an authentication method provided in an embodiment of the present invention. The apparatus may be a first network node 1, or the apparatus is located in the first network node 1. For other optional implementations of the apparatus, refer to the descriptions in the authentication method.

An embodiment of the present invention further provides an authentication apparatus. The apparatus may be a fourth network node 4, or the apparatus is located in a fourth network node 4. The apparatus includes: a positioning module, configured to determine position information 20 of a second network node 2; and a sending module, configured to send the position information 20 of the second network node 2 to a first network node 1, where the position information 20 is used by the first network node 1 to authenticate the second network node 2.

Optionally, before determining the position information 20 of the second network node 2, the positioning module is further configured to receive public key information 12 from the first network node 1, and determine the second network node 2 corresponding to the public key information 12, where the public key information 12 of the second network node 2 is a public key of the second network node 2 or is an operation value that uniquely corresponds to the second network node 2 and that is calculated according to a public key of the second network node 2.

Optionally, when determining the position information 20 of the second network node 2, the positioning module is specifically configured to: receive wireless information 200 sent by at least one third network node 3, where the wireless information 200 sent by each third network node 3 includes transmitted-signal strength information 140 of the second network node 2, received-signal strength information 160 of a signal transmitted by the second network node 2 and received by the third network node 3, and space position information of the third network node 3; and determine the position information 20 of the second network node 2 according to the wireless information 200 sent by the at least one third network node 3.

Optionally, the positioning module is further configured to determine the position information 20 of the second network node 2 according to respective wireless information 200 from third network nodes 3 deployed in at least three different positions.

Optionally, the first network node 1 is an EST server, the second network node 2 is an EST client, the third network node 3 is a Bluetooth low energy receiver, and the fourth network node 4 is a positioning server.

Optionally, the fourth network node 4 is integrated with the first network node 1.

For other optional implementations of the apparatus, refer to the descriptions in the authentication method.

Further, an embodiment of the present invention further provides a security processing apparatus, including: at least one memory, configured to store machine readable instructions; and at least one processor, configured to execute the machine readable instructions, to perform an authentication method provided in an embodiment of the present invention. The apparatus may be a fourth network node 4, or the apparatus is located in a fourth network node 4. For other optional implementations of the apparatus, refer to the descriptions in the authentication method.

An embodiment of the present invention further provides an authentication apparatus. The apparatus may be a second network node 2, or the apparatus is located in a second network node 2. The apparatus includes: a sending module, configured to send an enrollment request 10 to a first network node 1; and a receiving module, configured to receive an enrollment response 30 sent by the first network node 1 after the first network node 1 performs authentication according to position information 20 of a second network node 2.

Optionally, the sending module is further configured to: send public key information 12 of the second network node 2 to a fourth network node 4, where the public key information of the second network node 2 is a public key of the second network node 2 or is an operation value that uniquely corresponds to the second network node 2 and that is calculated according to a public key of the second network node 2, and the fourth network node 4 is configured to provide the position information 20 of the second network node 2 for the first network node 1; when sending the enrollment request 10 to the first network node 1, the sending module is specifically configured to add the public key of the second network node 2 to the enrollment request 10; and when receiving the enrollment response 30 sent by the first network node 1 after the first network node 1 performs authentication according to the position information 20 of the second network node 2, the receiving module is specifically configured to: receive the position information 20 of the second network node 2 obtained after the first network node 1 provides the public key information of the second network node 2 for the fourth network node 4, and receive the enrollment response 30 sent after the authentication is performed according to the position information 20 of the second network node 2.

For other optional implementations of the apparatus, refer to the descriptions in the authentication method.

Further, an embodiment of the present invention further provides a security processing apparatus, including: at least one memory, configured to store machine readable instructions; and at least one processor, configured to execute the machine readable instructions, to perform an authentication method provided in an embodiment of the present invention. The apparatus may be a second network node 2, or the apparatus is located in a second network node 2. For other optional implementations of the apparatus, refer to the descriptions in the authentication method.

In addition, the present invention further provides a machine-readable medium, storing instructions used to cause a machine to perform a verification method of program code of any authentication method in this specification. Specifically, a system or an apparatus equipped with a storage medium may be provided. The storage medium store software program code for implementing the function of any one of the foregoing embodiments, and a computer (or a CPU or a MPU) of the system or the apparatus is caused to read and execute the program code stored in the storage medium.

In this case, the program code read from the storage medium may implement the function of any one of the foregoing embodiments. Therefore, the program code and the storage medium storing the program code constitute a part of the present invention.

A storage medium embodiment used to provide the program code includes a floppy disk, a hard disk, a magnetic optical disc, an optical disc (for example, a CD-ROM, a CD-R, a CD-RW, a DVD-ROM, a DVD-RAM, a DVD-RW, or a DVD+RW), a magnetic tape, a non-volatile memory card, and a ROM. The storage medium may also be implemented by a cloud virtual machine. Optionally, program code may be downloaded by a communications network from a server.

In addition it should be understood that an operating system and the like operating on a machine may be caused to perform some or all actual operations not only by using program code read by a machine but also by using program code-based instruction, to implement the function of any one of the foregoing embodiments.

In addition, it may be understood that the program code read by the storage medium is written to a memory disposed on an expand card inserted into a machine or is written to a memory disposed in an expand unit connected to a machine. Subsequently, a CPU and the like installed on the expand card or the expand unit are caused to perform some or all actual operations by using program code-based instructions, to implement the function of any one of the foregoing embodiments.

It should be noted that in the foregoing procedures and system structural diagrams, not all the steps and modules are necessary, some steps or modules may be omitted according to an actual requirement. An execution sequence of the steps is not fixed and may be adjusted as needed. The system structure described in each of the foregoing embodiments may be a physical structure or a logical structure. That is, some modules may be implemented by a same physical entity, or some modules may be implemented by a plurality of physical entities respectively, or may be implemented by some components in a plurality of independent devices together.

In the foregoing embodiments, the hardware units may be implemented in a mechanical manner or an electrical manner. For example, one hardware unit may include an external dedicated circuit or logic (for example, a dedicated processor, an FPGA, or an ASIC) to implement a corresponding operation. The hardware unit may further include programmable logic or a circuit (for example, a general purpose processor or other programmable processors), and software may perform a temporary setting to complete a corresponding operation. A specific implementation (a mechanical manner, a dedicated eternal circuit, or a temporary circuit) may be determined based on costs and time.

Obviously, a person skilled in the art can make various modifications and variations to the exemplary embodiments of the present invention without departing from the spirit and scope of the present invention. Therefore, the present invention is intended to cover various modifications and equivalent arrangements included within the spirit and scope of the appended claims.

LIST OF REFERENCE NUMERALS

1 First network node
2 Second network node
3 Third network node
4 Fourth network node
10 Enrollment request
20 Position information
30 Enrollment response
12 Public key information
140 Transmitted-signal strength information
160 Received-signal strength information
200 Wireless information

What is claimed is:

1. An authentication method, comprising:
receiving, by a first network node, an enrollment request from a second network node;
obtaining a public key of the second network node from the enrollment request after the receiving, by the first network node, of the enrollment request from the second network node;
obtaining, by the first network node, position information of the second network node, wherein the obtaining, by the first network node, of the position information includes
sending, by the first network node, public key information of the second network node to a fourth network node, and
receiving the position information of the second network node sent by the fourth network node after the fourth network node determines the second network node corresponding to the public key information; and
authenticating, by the first network node, the second network node according to the position information obtained, of the second network node,
wherein the public key information of the second network node is the public key of the second network node or an operation value uniquely corresponding to the second network node and calculated according to the public key of the second network node.

2. The authentication method of claim 1, wherein the authenticating, by the first network node, of the second network node according to the position information obtained, of the second network node further comprises:
determining, by the first network node, whether the position information is within a trustable region; and
responding by the first network node, upon the position information being within the trustable region, to the enrollment request; or forbidding by the first network node, upon the position information not being within the trustable region, the enrollment request.

3. The authentication method of claim 1, wherein the first network node is an Enrollment over Secure Transport (EST) server, the second network node is an EST client, and the fourth network node is a positioning server.

4. An authentication apparatus at side of a first network node, the authentication apparatus comprising:
at least one memory, configured to store machine readable instructions; and
at least one processor, configured to execute the machine readable instructions, to cause the authentication apparatus to
receive an enrollment request from a second network node,
obtain, after the enrollment request is received from the second network node, a public key of the second network node from the enrollment request,
obtain position information of the second network node by
sending public key information of the second network node to a fourth network node, and
receiving the position information of the second network node sent by the fourth network node after the fourth network node determines the second network node corresponding to the public key information, wherein the public key information of the second network node is the public key of the second network node or is an operation value uniquely corresponding to the second network node and calculated according to the public key of the second network node, and authenticate the second network node according to the position information obtained, of the second network node.

5. The authentication apparatus of claim 4, wherein when authenticating the second network node according to the position information obtained of the second network node, the at least one processor is further configured to execute the machine readable instructions to cause the authentication apparatus to:

determine whether the position information is within a trustable region; and respond to the enrollment request upon the position information being within the trustable region; or forbidding the enrollment request upon the position information not being within the trustable region.

6. The authentication apparatus of claim 4, wherein the first network node is an Enrollment over Secure Transport (EST) server, the second network node is an EST client, and the fourth network node is a positioning server.

7. The authentication apparatus of claim 4, wherein when authenticating the second network node according to the position information obtained of the second network node, the at least one processor is further configured to execute the machine readable instructions to cause the authentication apparatus to determine whether the position information is within a trustable region; and respond to the enrollment request upon the position information being within the trustable region; or forbidding the enrollment request upon the position information not being within the trustable region.

8. An authentication method, comprising:

receiving, by a fourth network node, public key information from a first network node;

determining a second network node corresponding to public key information, the public key information of the second network node being a public key of the second network node or being an operation value uniquely corresponding to the second network node and calculated according to the public key of the second network node;

determining, by the fourth network node, position information of the second network node after receiving the public key information and determining the second network node corresponding to the public key; and sending, by the fourth network node, the position information of the second network node to the first network node, wherein the position information is usable by the first network node to authenticate the second network node.

9. An authentication method, comprising:

determining, by a fourth network node, position information of a second network node by receiving wireless information sent by at least one third network node, the wireless information sent by each respective third network node of the at least one third network node, including transmitted-signal strength information of the second network node, received-signal strength information of a signal transmitted by the second network node and received by the respective third network node, and space position information of the respective third network node, and determining the position information of the second network node according to the wireless information sent by the at least one third network node; and sending, by the fourth network node, the position information of the second network node to a first network node, wherein the position information is usable by the first network node to authenticate the second network node.

10. The authentication method of claim 9, wherein the fourth network node determines the position information of the second network node according to respective wireless information from respective third network nodes deployed in at least three different positions.

11. The authentication method of claim 9, wherein the first network node is an Enrollment over Secure Transport (EST) server, the second network node is an EST client, the third network node is a Bluetooth low energy receiver, and the fourth network node is a positioning server.

12. An authentication apparatus of a fourth network node, the authentication apparatus comprising:

at least one memory, configured to store machine readable instructions; and at least one processor, configured to execute the machine readable instructions, to cause the authentication apparatus to receive public key information from a first network node, determining a second network node corresponding to the public key information, wherein the public key information of the second network node is a public key of the second network node or is an operation value uniquely corresponding to the second network node and calculated according to the public key of the second network node, determine position information of the second network node after the public key information is received and the second network node corresponding to the public key is determined; and send the position information of the second network node to the first network node, wherein the position information is usable by the first network node to authenticate the second network node.

13. An authentication apparatus of a fourth network node, comprising:

at least one memory, configured to store machine readable instructions; and at least one processor, configured to execute the machine readable instructions, to cause the authentication apparatus to determine position information of a second network node by receiving wireless information sent by at least one third network node, the wireless information sent by each respective third network node of the at least one third network node including transmitted-signal strength information of the second network node, received-signal strength information of a signal transmitted by the second network node and received by the respective third network node, and space position information of the respective third network node, and determining the position information of the second network node according to the wireless information sent by the at least one third network node, and send the position information of the second network node to a first network node, wherein the position information is usable by the first network node to authenticate the second network node.

14. The authentication apparatus of claim 13, wherein the at least one processor is further configured to execute the machine readable instructions to cause the authentication apparatus to determine the position information of the second network node according to respective wireless information from respective third network nodes deployed in at least three different positions.

15. The authentication apparatus of claim 13, wherein the first network node is an Enrollment over Secure Transport (EST) server, the second network node is an EST client, the third network node is a Bluetooth low energy receiver, and the fourth network node is a positioning server.

* * * * *